US008824092B2

(12) United States Patent
Chauhan et al.

(10) Patent No.: US 8,824,092 B2
(45) Date of Patent: Sep. 2, 2014

(54) SKEW COMPENSATION SIGNAL

(75) Inventors: Sundeep Chauhan, Fremont, CA (US);
Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 968 days.

(21) Appl. No.: 12/941,466

(22) Filed: Nov. 8, 2010

(65) Prior Publication Data

US 2012/0113539 A1 May 10, 2012

(51) Int. Cl.
G11B 5/56 (2006.01)
G11B 20/10 (2006.01)
B82Y 10/00 (2011.01)
G11B 5/012 (2006.01)
G11B 5/74 (2006.01)
G11B 5/09 (2006.01)

(52) U.S. Cl.
CPC *G11B 5/012* (2013.01); *G11B 5/56* (2013.01); *B82Y 10/00* (2013.01); *G11B 5/09* (2013.01); *G11B 20/10* (2013.01); *G11B 5/743* (2013.01)
USPC .............................................. 360/76; 360/51

(58) Field of Classification Search
None
See application file for complete search history.

(56) References Cited

U.S. PATENT DOCUMENTS

| 4,652,730 | A | 3/1987 | Marshall | |
|---|---|---|---|---|
| 6,963,462 | B2 | 11/2005 | Satoh | |
| 7,848,046 | B2 * | 12/2010 | Sakurai et al. | 360/76 |
| 7,848,047 | B2 * | 12/2010 | Albrecht | 360/75 |
| 7,848,048 | B1 * | 12/2010 | Albrecht et al. | 360/75 |
| 7,864,470 | B2 * | 1/2011 | Gao et al. | 360/76 |
| 7,911,724 | B2 * | 3/2011 | Buch et al. | 360/51 |
| 8,427,772 | B2 * | 4/2013 | Lille et al. | 360/75 |
| 2008/0304173 | A1 * | 12/2008 | Albrecht et al. | 360/51 |
| 2009/0002865 | A1 * | 1/2009 | Venkataramani et al. | 360/51 |

* cited by examiner

Primary Examiner — Regina N Holder
Assistant Examiner — James L Habermehl
(74) Attorney, Agent, or Firm — HolzerIPLaw, PC

(57) ABSTRACT

The relative trajectory of a transducer head over bit-patterned media (BPM) may be skewed with respect to a down-track direction on the media (i.e., skew error). In order to resolve the skew error, the presently disclosed technology measures the skew error without adding additional patterning on the media. A detector circuit detects a sequential series of data bits on a storage media. The sequential series of data bits alternate between at least two tracks on the storage media. The sequential series of data bits are sent to a timing circuit, which sets a time stamp indicating when each data bit is received using, for example, a delay chain or a voltage ramp. A time elapsed between receiving a first data bit, a second data bit, and a third data bit is tracked. Transducer head skew is adjusted based on a signal containing the time elapsed between the bits.

18 Claims, 6 Drawing Sheets

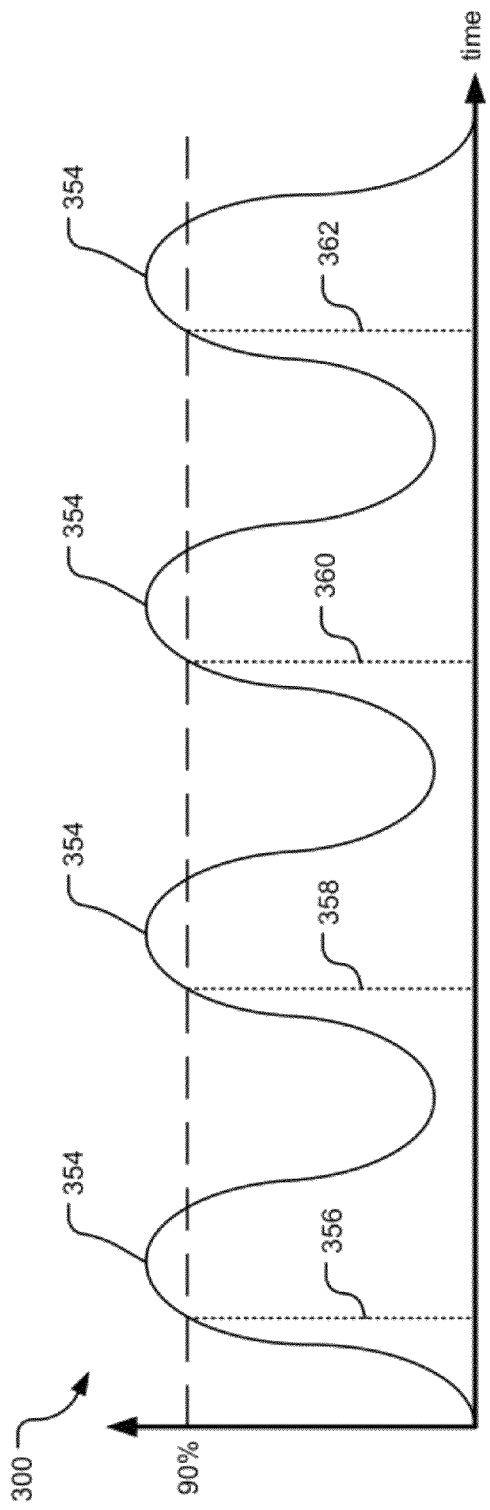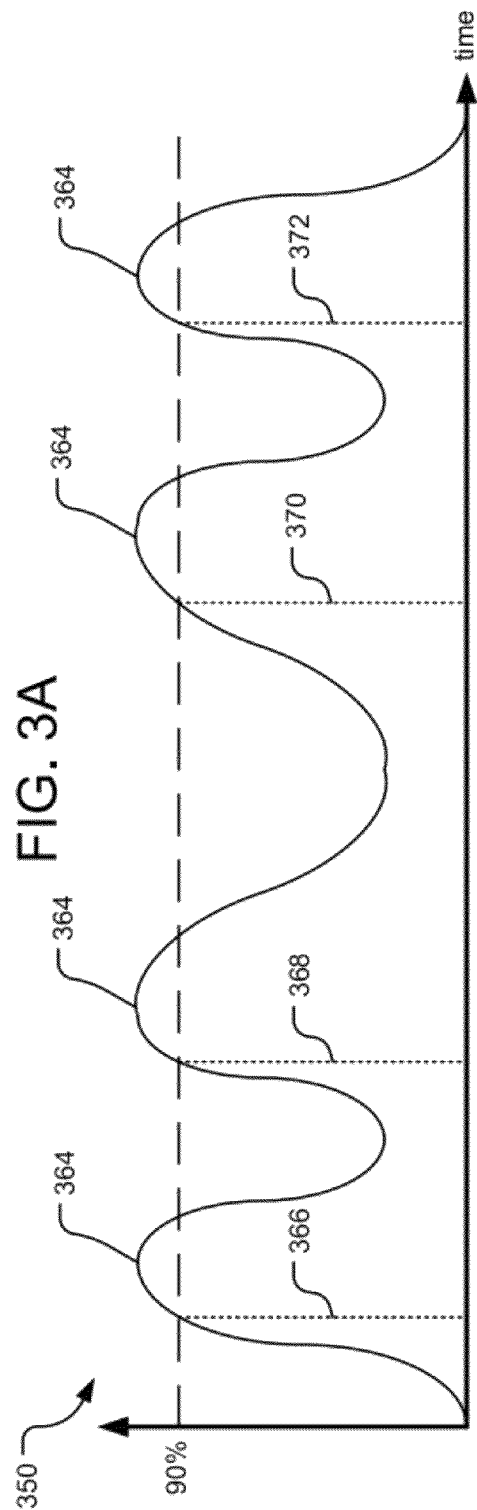
FIG. 3A
FIG. 3B

SKEW COMPENSATION SIGNAL

SUMMARY

Implementations described and claimed herein provide a timing signal corresponding to transducer head skew including a time elapsed between receiving first and second sequential data bits in a read-back signal.

Other implementations are also described and recited herein.

BRIEF DESCRIPTIONS OF THE DRAWINGS

FIG. 3A illustrates an example analog readback signal of an aligned transducer head.

FIG. 3B illustrates an example analog readback signal of a skewed transducer head.

DETAILED DESCRIPTIONS

In an effort to increase areal density of recording media, a magnetic recording layer is formed with an array of patterned cells, wherein each cell can hold a bit of data (e.g., bit patterned media (BPM)). With BPM, data is be written to and read from the individual bits along a series of circular or nearly circular data tracks on a media (e.g., a magnetic disc) using a transducer head aligned with the data tracks. An ideal transducer head orientation is perpendicular to the data tracks.

A rotary voice coil motor that rotates about actuator axis of rotation 114 (see FIG. 1) is typically used to position the transducer on a data track and a spindle motor that rotates about disc axis of rotation 112 (see FIG. 1) is used to rotate the media. Skew angle is the angle between a tangent to a data track at the transducer head location and a line extending from the pivot of the voice coil motor through the transducer (i.e., pivot-to-gap). Therefore, the skew angle at a radial location depends on drive geometry including pivot-to-gap and distance between disc axis of rotation 112 and the actuator axis of rotation 114 (center-to-center). By design, a drive has a nominal skew profile that is a function of radial location of the transducer head on the media. This nominal skew profile is patterned into the media and is used to define the location of data tracks on the media both radially and circumferentially. Because of tolerance stack-up during drive assembly and part-to-part tolerances in the components (e.g., pivot-to-gap, center-to-center, etc.) the resulting skew profile will typically differ from the nominal profile. This deviation in skew profile from the nominal skew profile is termed as skew error.

In order to adjust for the skew error either in real-time, periodically, or once during drive assembly, the presently disclosed technology measures the skew error without adding additional patterning on the media. This measurement may then be used to reduce or eliminate the skew error using microactuators or other adjustment schemes at the transducer head. However, measuring the skew error is especially challenging due to the small scale of the patterned bits (e.g., 10 nano-meters wide) and timing control requirements in a disc system rotating at high speeds (e.g., 5,400-15,000 rotations per minute). The presently disclosed technology may also be applicable to storage media types other than BPM that exhibit the challenges described herein.

Figure 1:
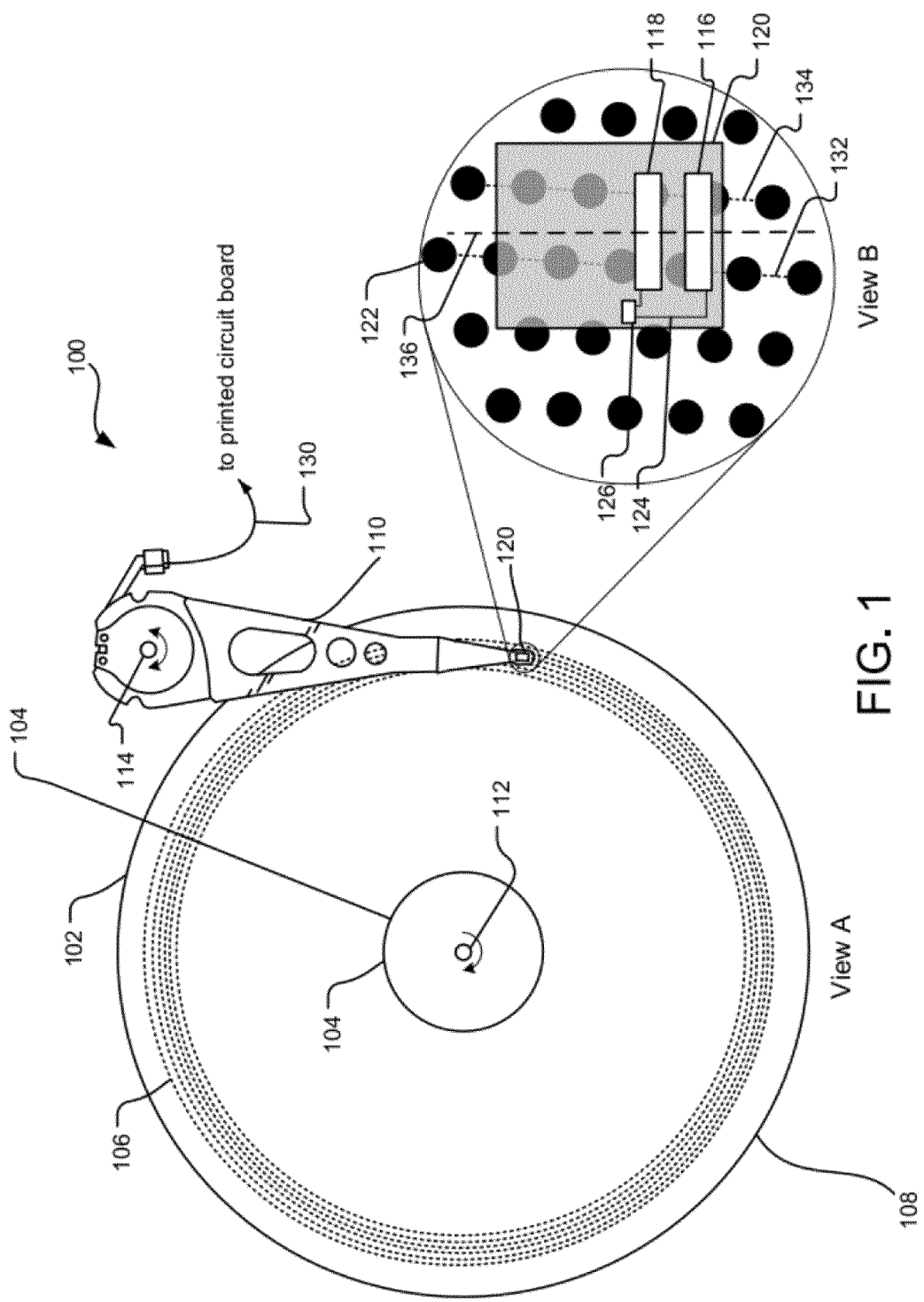
FIG. 1 illustrates a plan view of an example disc drive assembly including a transducer head on a distal end of an actuator arm positioned over a bit patterned media disc.

FIG. 1 illustrates a plan view of an example disc drive assembly 100 including a transducer head 120 on a distal end of an actuator arm 110 positioned over a bit patterned media (BPM) disc 108. Referring specifically to View A, the media 108 includes an outer diameter 102 and inner diameter 104 between which are a number of data tracks 106 (e.g., data track 132), illustrated by circular dotted lines. The data tracks 106 are substantially circular and are made up of regularly spaced patterned bits. In one implementation, the media 108 rotates at a constant high speed about disc axis of rotation 112 as information is written to and read from the data tracks 106 on the media 108. In another implementation, the media speed is variable.

Information may be written to and read from the patterned bits on the media 108 through the use of the actuator arm 110. The actuator arm 110 rotates about an actuator axis of rotation 114 during a seek operation to located a desired data track on the media 108. The actuator arm 110 extends toward the media 108, and at the distal end of the actuator arm 110 is the transducer head 120, which flies in close proximity above the media 108 while reading and writing data to the media 108. In other implementations, there is more than one transducer head 120, actuator arm 110, and/or media 108 in the disc drive assembly 100.

A flex cable 130 provides the requisite electrical connection paths for the transducer head 120 while allowing pivotal movement of the actuator arm 110 during operation. The flex cable 130 connects a printed circuit board (PCB) (not shown) to the transducer head 120. The flex cable 130 routes along the actuator arm 110 from the PCB to the transducer head 120. The PCB typically includes circuitry for controlling the write currents applied to the transducer head 120 during a write operation and a preamplifier for amplifying read signals generated by the transducer head 120 during a read operation. Further, the PCB may contain circuitry used to implement the presently disclosed technology described in detail with regard to FIGS. 4 and 5.

The transducer head 120 is shown in greater detail in View B of FIG. 1 and includes a writer 118, a reader 116, bond pads 126, and data signal wires (e.g., data signal wire 124) electrically connecting the writer 118 and reader 116 to the bond pads 126. The patterned bits (e.g., patterned bit 122) along a data track of patterned bits bounded by lines 132, 134 sequentially pass underneath the writer 118 and reader 116 as the media 108 rotates. Further, the patterned bits are shown in a staggered array; however, other patterned bits arrangements are contemplated. The reader 116 is oriented along axis 136, which is not always parallel to data tracks 132, 134. The relative angular difference between axis 136 and data tracks 132, 134 is transducer skew error. Implementations of the presently disclosed technology measure this skew error so that the skew error may be corrected (see e.g., FIGS. 4 and 5).

More specifically, the transducer head 120 is aligned with line 136, which is plotted from the axis of rotation 114 to the transducer head 120. The data track is aligned with tangential lines 132, 134 underneath the transducer head 120. The skew error is equal to the difference in angle between line 136 and tangential lines 132, 134.

The reader 116 on the transducer head 120 reads data from the patterned bits on the media 108 and the writer 118 writes data to the patterned bits on the media 108. A data signal containing data to be written to the patterned bits is sent from the PCB, through the flex cable 130, and to the bond pads 126 attached to the exterior of the transducer head 120. The data signal is then sent to the writer 118 via the data signal wires within the transducer head 120. The reader 116 operates best when the skew error is at a minimum as illustrated in FIGS. 2 and 3.

Figure 2:
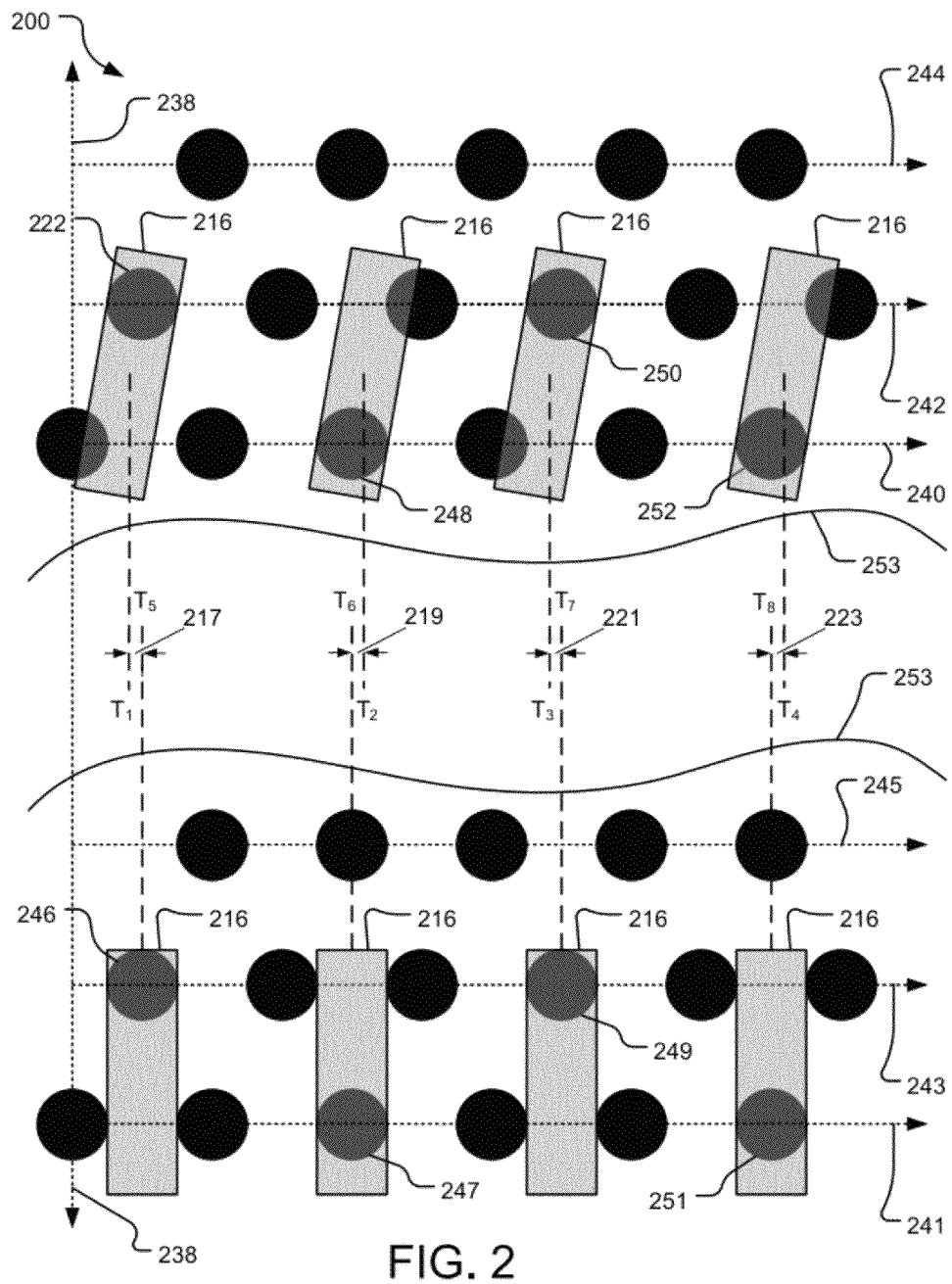
FIG. 2 illustrates six rows of bits in an example staggered patterned bit configuration with a reader at a skewed orientation at four time stamps and an aligned orientation at four more time stamps.

FIG. 2 illustrates six rows 240, 242, 244, 241, 243, 245 of bits in an example staggered patterned bit configuration 200 with a reader 216 at a skewed orientation at four time stamps ($T_1$, $T_2$, $T_3$, and $T_4$) and an aligned orientation at four more time stamps ($T_5$, $T_6$, $T_7$, and $T_8$). Axis 238 illustrates cross-track directions and the arrows on tracks 240, 242, 244, 241, 243, and 245 point down-track. Break lines 253 illustrate that many rows of bits may exist between row 240 and row 245 within the staggered patterned bit configuration 200. The reader 216 follows a track on a media comprising two adjacent rows of bits (e.g., rows 240, 242). The reader 216 may follow other tracks (i.e., pairs of adjacent rows of bits).

The reader 216 is shown at eight different positions for illustration purposes only. In practice, the patterned bits (e.g., patterned bit 222) are moving right to left as a corresponding disc spins and the reader 216 remains relatively stationary. In one implementation, when the reader 216 is at one general region within the staggered patterned bit configuration 200, the reader 216 is aligned with a corresponding track (see e.g., the bottom-depicted orientation). Similarly, when the reader 216 is at another general location within the staggered patterned bit configuration 200, the reader 216 is skewed with respect to the corresponding track (see e.g., the top-depicted orientation).

For illustration purposes, the reader 216 in a skewed orientation is depicted directly over every third patterned bit (i.e., patterned bits 222, 248, 250, & 252) on rows 240 & 242 with corresponding time stamps ($T_1$, $T_2$, $T_3$, and $T_4$) marking a relative time when the reader 216 is over every third patterned bit. The reader 216 reads rows 240 & 242 simultaneously as the reader 216 flies over the staggered bit configuration 200. The reader 216 may shift in the cross track direction (i.e., along axis 238) to read a different track (e.g., rows 242 & 244).

Similarly, the reader 216 in an aligned orientation is depicted directly over every third patterned bit (i.e., patterned bits 246, 247, 249, & 251) on rows 241 & 243 with corresponding time stamps ($T_5$, $T_6$, $T_7$, and $T_8$) marking a relative time when the reader 216 is over every third patterned bit. The reader 216 reads rows 241 & 243 simultaneously as the reader 216 flies over the staggered bit pattern 200. The reader 216 may shift in the cross track direction (i.e., along axis 238) to read a different track (e.g., rows 243 & 245).

Comparing the reader 216 reading the patterned bits on rows 240, 242 at time intervals ($T_1$, $T_2$, $T_3$, and $T_4$) to the reader 216 reading patterned bits on rows 241, 243 at the time intervals ($T_5$, $T_6$, $T_7$, and $T_8$), a retard and advance effect caused by reader skew becomes evident. More specifically, the reader 216 flies over patterned bit 222 at $T_1$ before the reader 216 flies over patterned bit 246 at $T_5$. As a result, the signal output from the reader 216 in a skewed orientation is at first advanced with respect to the reader 216 in an aligned orientation, as evidenced by time gap 217. Next, the reader 216 flies over patterned bit 248 at $T_2$ after the reader 216 flies over patterned bit 247 at $T_6$. As a result, the signal output from the reader 216 in a skewed orientation transitioned from advanced to retarded with respect to the reader 216 in an aligned orientation, as evidenced by time gap 219.

Next, the reader 216 flies over patterned bit 250 at $T_3$ before the reader 216 flies over patterned bit 249 at $T_7$. As a result, the signal output from the reader 216 in a skewed orientation transitioned from retarded back to advanced with respect to the reader 216 in an aligned orientation, as evidenced by time gap 221. Finally, the reader 216 flies over patterned bit 252 at $T_4$ after the reader 216 flies over patterned bit 251 at $T_8$. As a result, the signal output from the reader 216 in a skewed orientation transitioned from advanced back to retarded with respect to the reader 216 in an aligned orientation, as evidenced by time gap 223. This advanced-retarded-advanced-retarded pattern repeats as the reader 216 flies over additional down-track patterned bits (not shown) on tracks 240 & 242.

The quantity of advance and retard of the reader 216 in a skewed orientation compared to the reader 216 in an aligned orientation is directly proportional to the amount of skew error. As a result, a measurement of the advance and retard is used to measure the skew error. This is discussed in more detail with regard to FIGS. 4 and 5. Additionally, FIG. 2 shows the reader 216 over every third patterned bit for illustration purposes only. The same pattern is present when every patterned bit is tracked rather than every three patterned bits, albeit with a higher frequency. Further, other bit detection schemes (e.g., every other patterned bit or every six patterned bits) may yield a desired frequency while not overloading the circuitry used to implement the presently disclosed technology.

FIG. 3A illustrates an example analog readback signal 300 of an aligned transducer head. The readback signal 300 has a regularly spaced magnitude peaks 354 corresponding to patterned bits on a media. A threshold level indicating the presence of the patterned bits is set. Here, the threshold is 90% of peak value. As the readback signal magnitude increases above the threshold value, the presence of a patterned bit is detected. The presence of the patterned bits is indicated at times 356, 358, 360, and 362. The times are regularly spaced because the transducer head is aligned with a track of patterned bits.

FIG. 3B illustrates an example analog readback signal 350 of a skewed transducer head. The readback signal 350 has irregularly spaced peaks 364 corresponding to patterned bits on a media. A threshold level indicating the presence of the patterned bits is set. Here, the threshold is 90% of peak value. As the readback signal magnitude increases above the threshold value, the presence of a patterned bit is detected. The presence of the patterned bits is indicated at times 366, 368, 370, and 372. The times are irregularly spaced because the transducer head is skewed with respect to a track of patterned bits.

The readback signal 350 of FIG. 3B illustrates the advanced-retarded phenomenon discussed with regard to FIGS. 2A and 2B when compared to the readback signal 300 of FIG. 3A. For illustration purposes, all the detected bits in the readback signals 300 and 350 have the same polarity (e.g., when the corresponding media is DC erased). However, the advanced-retarded phenomenon also exists when the polarity of the detected bits vary.

Further, the readback signals 300 and 350 may include various low-frequency noises that do not correspond to the patterned bits (e.g., vibration from the disc media). To compensate for the low-frequency noises, the readback signals 300 and 350 may be first adaptively thresholded before being used to detect the presence of the patterned bits. For example, a low-pass filter may be applied to the readback signals 300 and 350 to calculate an adaptive threshold for the readback signals 300 and 350.

Timing control requirements in a disc system rotating at high speeds make measuring the aforementioned advance and retard of the skewed reader difficult to measure. The following example implementation circuits 400, 500 of FIGS. 4 and 5 track advance and retard in real time under the tight timing control requirements. Other implementation circuits are also envisioned that measure the advance and retard of the skewed reader in real time.

Figure 4:
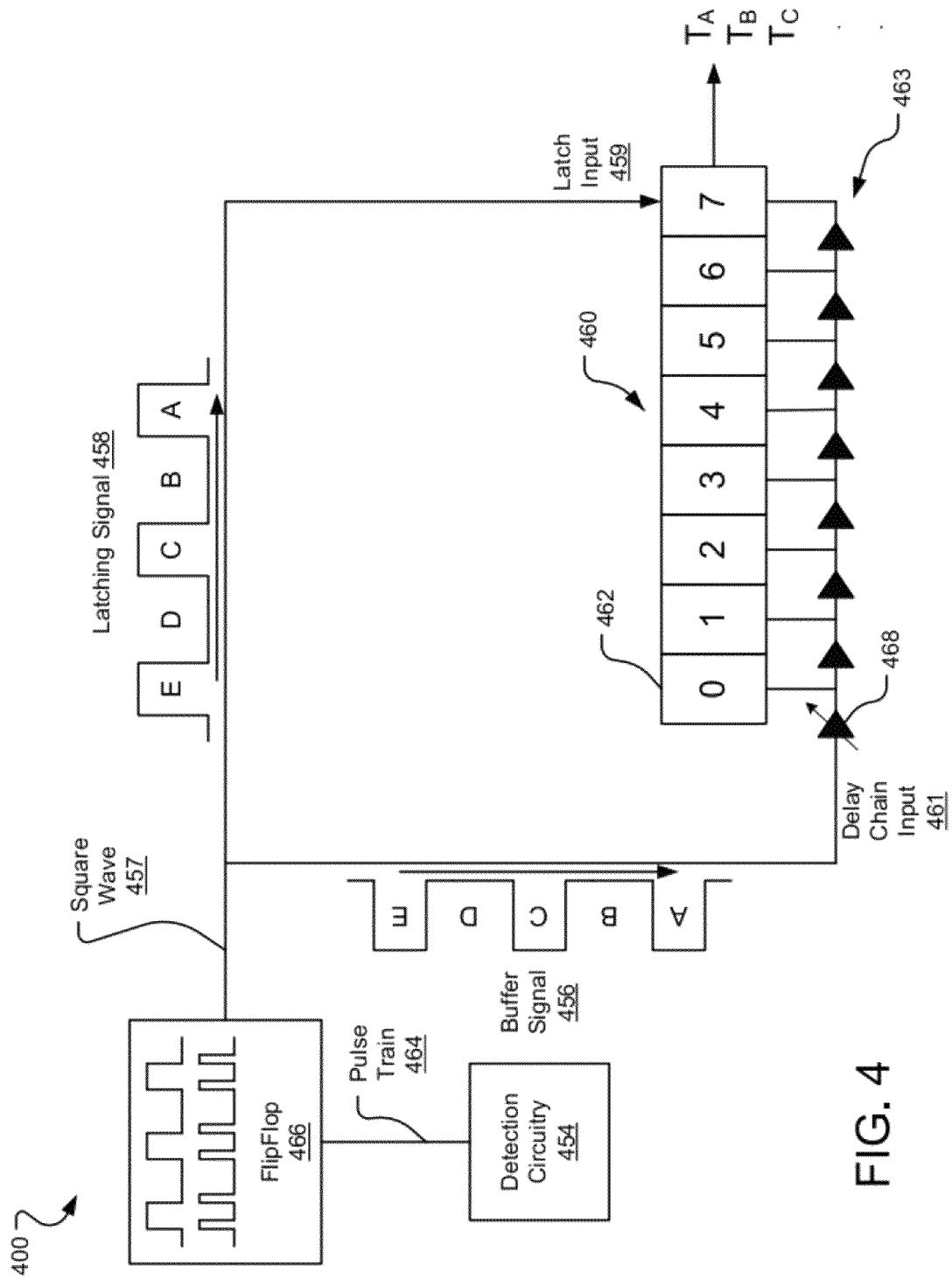
FIG. 4 illustrates example implementation circuitry utilizing a latched buffer delay.

FIG. 4 illustrates example implementation circuitry 400 utilizing a latched buffer delay. Detection circuitry 454 detects an analog signal corresponding to a transducer head passing over patterned bits on a media and converts the analog signal to a digital pulse train 464. The detection circuitry 454 may be a peak detection or zero crossing type detector, for example. The pulse train 464 is fed into a FlipFlop circuit 466, where the digital pulse train 464 is converted into a square wave 457 with a duty cycle proportional to skew of the detected patterned bits on the media. The FlipFlop circuit 466 operates by toggling for high to low or low to high on each rising edge of the digital pulse train 464. The FlipFlop circuit 466 may be a T-FlipFlop (Toggle Type), for example.

The square wave 457 contains a train of highs (e.g., A, C, & E) and lows (e.g., B & D). The time elapsed between an adjacent high and low (e.g., A & B) in the square wave 457 is equivalent to the time detecting two adjacent bits in the pulse train 464. If the pulse train 464 corresponds to an aligned transducer head, the adjacent highs and lows will be equivalent. However, if the transducer head is skewed with respect to a track of patterned bits on a media, the adjacent highs and lows will not be equivalent. The implementation circuitry 400 detects the time difference between adjacent highs and a lows in the square wave 457 that is used to correct for skew error.

The train of highs and lows is input into a buffer signal 456 at delay chain input 461 and a latching signal 458 at latch input 459. The buffer signal 456 is fed into a timing buffer 460 having a delay chain 463 with a known time delay between each cell (e.g., cell 462) in the delay chain 463. Further, a variable delay 468 is located at the timing buffer 460 before the first cell 462 that allows adjustment of when the buffer signal 456 is input into the timing buffer 460 in relation to when the latching signal 458 is input into the timing buffer 460. The latching signal 458 latches the state of the buffer 460 to output a time delay measurement of a high or a low based on the known time delay of two adjacent highs and lows and a total number of highs and lows. The latching signal 458 also resets the buffer 460 to receive the next high or low.

In an example implementation, high A in the buffer signal 456 and the latching signal 458 arrive at their respective inputs 462, 459 into the buffer 460 simultaneously (or with a known delay between the two). The high A in the latching signal 458 resets the buffer 460 (e.g., turns all cells to "0") and high A in the buffer signal 456 is received into the buffer 460. High A is sequentially written to cells (e.g., turns cells to "1") in the buffer 460 as the signal traverses through the delay chain 463 until low B in the latching signal 458 is received by at the latch input 459 of the buffer 460. Low B in the latching signal 458 signals to the buffer 460 to latch its current state and output the contents of the buffer, which represent a time value associated with the number of written cells ($T_A$). The latching signal 458 low B also resets the buffer 460 to receive high C from the buffer signal 456. This process repeats to obtain $T_B$, $T_C$, etc.

In one implementation, the time between adjacent highs and lows is known (e.g., $T_{AB}$). For example, $T_A$ is compared with $T_{AB}$ to determine skew error. If $T_A$ equals half of $T_{AB}$, the transducer head is aligned with a track of patterned bits on the media. If $T_A$ is less than or greater than half of $T_{AB}$, then the transducer head is skewed with respect to the track of patterned bits on the media. The amount of skew error is proportional to the magnitude of time difference of $T_A$ from half of $T_{AB}$. In an implementation where $T_{AB}$ is unknown, a difference between adjacent measured time values of a high and a low from the delay chain 463 is also as a metric of the quantity of head skew. In an aligned transducer head, the measured time values should be the same. In a skewed transducer head, the adjacent measured time values will oscillate indicating an advanced-retarded-advanced-retarded pattern as described above with respect to FIG. 2.

A delay line with finite resolution may also be used to track when a first input signal reaches the output of a device after a known period of time has elapsed. The output of the delay line is latched by using a second input signal, which yields a signal corresponding to the delay between the first input signal and the second input signal. This delay signal represents a time value of highs and lows, which is a metric of skew as discussed above.

Figure 5:
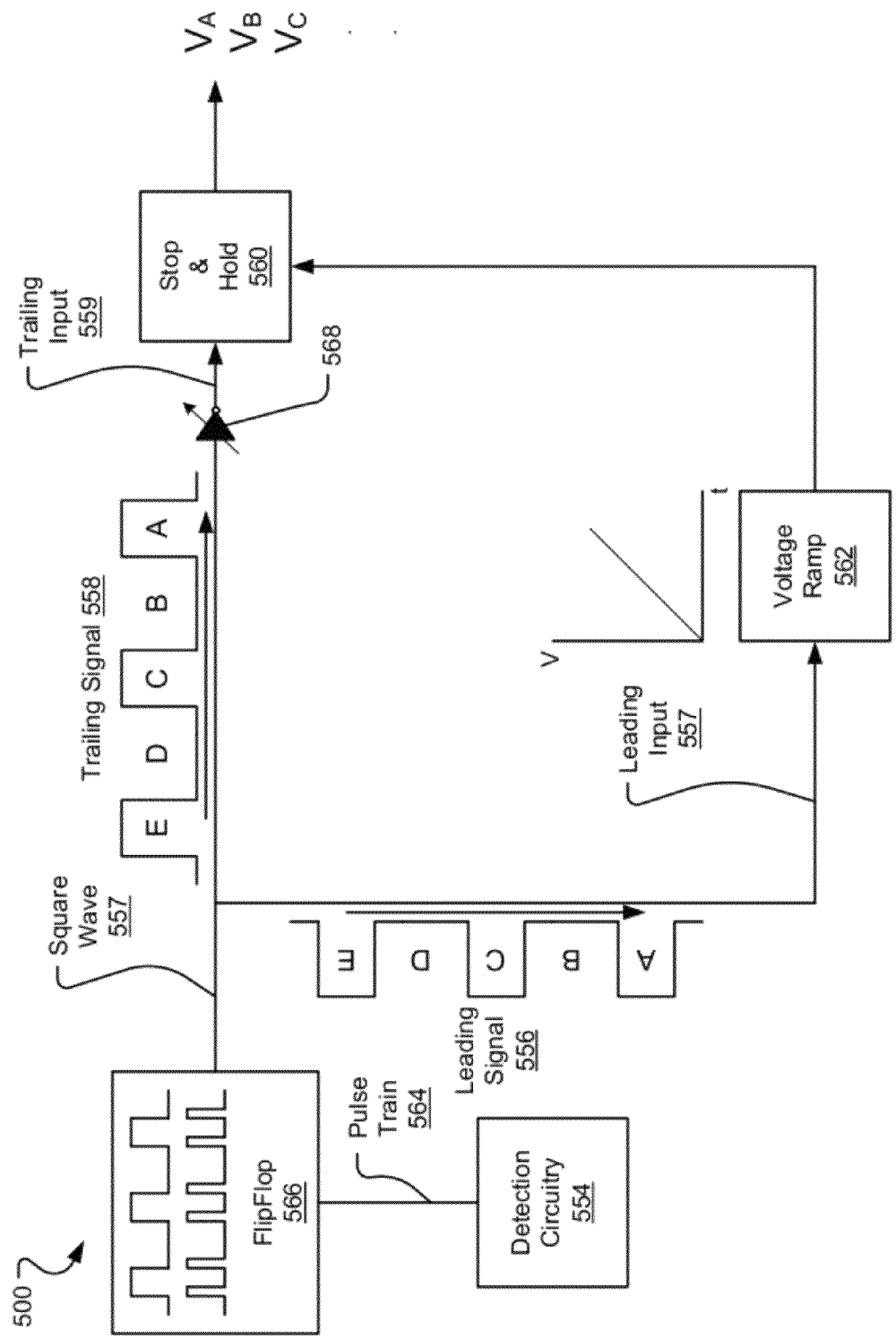
FIG. 5 illustrates example implementation circuitry utilizing a voltage ramp.

FIG. 5 illustrates example implementation circuitry 500 utilizing a voltage ramp 562. Detection circuitry 554 detects an analog signal corresponding to a transducer head passing over patterned bits on a media and converts the analog signal to a digital pulse train 564. The detection circuitry 554 may be a peak detection or zero crossing type detector, for example. The pulse train 564 is fed into a FlipFlop circuit 566, where the digital pulse train 564 is converted into a square wave 557 with a duty cycle proportional to skew of the detected patterned bits on the media. The FlipFlop circuit 566 operates by toggling for high to low or low to high on each rising edge of the digital pulse train 564. The FlipFlop circuit 566 may be a T-FlipFlop (Toggle Type), for example.

The square wave 557 contains a train of highs (e.g., A, C, & E) and lows (e.g., B & D). The time elapsed between an adjacent high and low (e.g., A & B) in the square wave 557 is equivalent to the time detecting two adjacent bits in the pulse train 564. If the pulse train 564 corresponds to an aligned transducer head, the adjacent highs and lows will be equivalent. However, if the transducer head is skewed with respect to a track of patterned bits on a media, the adjacent highs and lows will not be equivalent. The implementation circuitry 500 detects the time difference between adjacent highs and a lows in the square wave 557 that is used to correct for skew error.

The train of highs and lows is input into two inputs; a leading signal 556 into a leading input 557 and a trailing signal 558 into a trailing input 559. Further, a variable delay 568 is located at the trailing input 559 before the trailing signal 558 enters a sample & hold circuit 560. The variable delay 568 allows adjustment of when the trailing signal 558 is input into the sample & hold circuit 560 in relation to when the leading signal 556 is input into the voltage ramp 562. The leading signal 556 is fed into the voltage ramp circuit 562 with a known relation between time and voltage output from the voltage ramp circuit 562 (e.g., a slew rate in kV/s). The voltage ramp circuit 562 may be any precision analog ramp source (e.g., a voltage-controlled oscillator or oscilloscope). The sample & hold circuit 560 records the output voltage of the voltage ramp circuit 562 when the next high or low of the trailing signal 558 is detected. The sample & hold circuit 560 also resets the voltage ramp circuit 562 to receive the next high or low of the leading signal 556.

In an example implementation, high A in the leading signal 556 arrives at the voltage ramp circuit 562 and high A in the trailing signal 558 arrives at the sample & hold circuit 560 simultaneously (or with a known delay between the two). The high A in the trailing signal 558 signals the voltage ramp circuit 562 to reset (e.g., set V=0) and receive the high A in the leading signal 556 into the voltage ramp circuit 562. Output voltage from the voltage ramp circuit 562 increases at a known rate over time until low B in the trailing signal 558 is received by the sample & hold circuit 560. Trailing signal 558 low B signals to the sample & hold circuit 560 to record the current output voltage of the voltage ramp circuit 562, which corresponds to a time of high A ($V_A$). The trailing signal 558 low B also resets the voltage ramp circuit 562 to receive low B from the leading signal 556. This process repeats to obtain $V_B$, $V_C$, etc.

Further, $V_B$, $V_C$, etc. may be converted to time between data bits (e.g., $T_B$, $T_C$, etc.) using a known relationship between voltage and time in the voltage ramp circuit 562 either within the sample & hold circuit 560 or within other circuitry (not shown). In one implementation, the time between adjacent highs and lows is known (e.g., $T_{AB}$). For example, $T_A$ is compared with $T_{AB}$ to determine skew error. If $T_A$ equals half of $T_{AB}$, the transducer head is aligned with a track of patterned bits on the media. If $T_A$ is less than or greater than half of $T_{AB}$, then the transducer head is skewed with respect to the track of patterned bits on the media. The amount of skew error is proportional to the magnitude of time difference of $T_A$ from half of $T_{AB}$. In an implementation where $T_{AB}$ is unknown, a difference between adjacent measured time values of a high and a low from the delay chain 463 is also as a metric of the quantity of head skew. In an aligned transducer head, the measured time values should be the same. In a skewed transducer head, the adjacent measured time values will oscillate indicating an advanced-retarded-advanced-retarded pattern as described above with respect to FIG. 2.

An analog-to-digital converter may be used for either compensation and/or estimation of the advance and/or retard of a skewed transducer head that corresponds to the detected train of highs and lows. Further, the sampling rate of the voltage ramp circuit 562 and/or sample & hold circuit 560 may be varied to obtain a desirable mixture of detection resolution and necessary detector and/or processor power.

Figure 6:
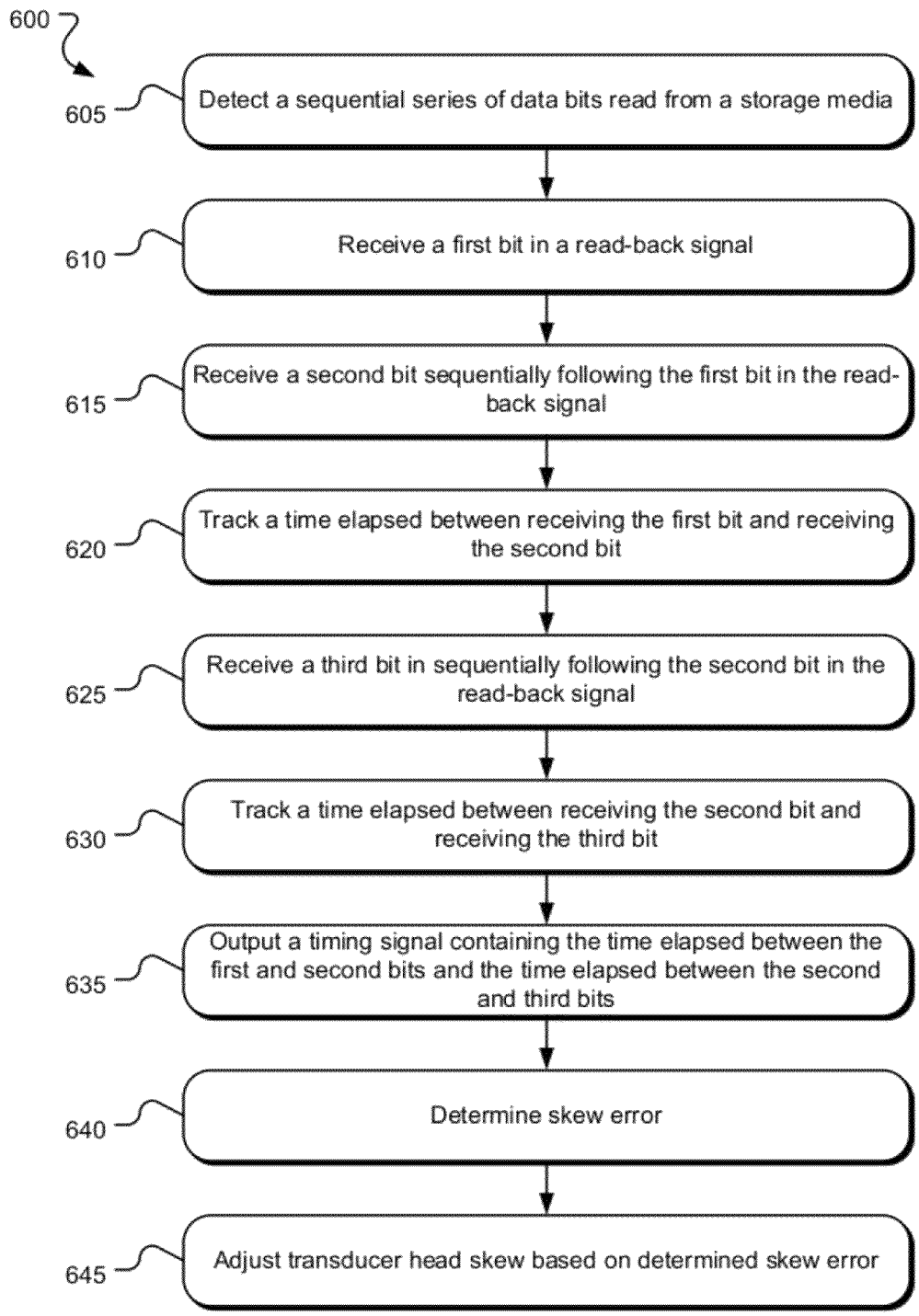
FIG. 6 illustrates example operations for measuring and correcting transducer head skew with respect to tracks of patterned bits on a media.

FIG. 6 illustrates example operations 600 for measuring and correcting transducer head skew with respect to tracks of patterned bits on a media. In a detecting operation 605, a detector circuit detects a sequential series of data bits on a storage media. The sequential series of data bits alternate between at least two lines of data bits on the storage media. The detector circuit transmits the sequential series of data bits in the form of a read-back signal to a timing circuit. In a first receiving operation 610, a first data bit in the read-back signal is received by the timing circuit. The timing circuit sets a time stamp indicating when the first data bit is received using, for example, a timing buffer or a voltage ramp (see e.g., FIGS. 4 and 5).

In a second receiving operation 615, a second data bit in the read-back signal is received by the timing circuit. The second data bit sequentially follows the first data bit. In some implementations, there are a predetermined number of data bits separating the second data bit and the first data bit. In other implementations, the second data bit is directly adjacent in the first data bit in the read-back signal and thus no data bits exist between the first data bit and the second data bit in the read-back signal. In a first tracking operation 620, a time elapsed between receiving the first data bit and receiving the second data bit is tracked. The timing circuit sets a time stamp indicating when the second data bit is received using, for example, the timing buffer or the voltage ramp. The time elapsed is the difference between the time stamp when the first data bit is received and the time stamp when the second data bit is received.

In a third receiving operation 625, a third data bit in the read-back signal is received by the timing circuit. The third data bit sequentially follows the second data bit. In some implementations, there are a predetermined number of data bits separating the third data bit and the second data bit. In other implementations, the third data bit is directly adjacent in the second data bit in the read-back signal and thus no data bits exist between the second data bit and the third data bit in the read-back signal. In a second tracking operation 630, a time elapsed between receiving the second data bit and receiving the third data bit is tracked. The timing circuit sets a time stamp indicating when the third data bit is received using, for example, the timing buffer or the voltage ramp. The time elapsed is the difference between the time stamp when the second data bit is received and the time stamp when the third data bit is received.

In an output operation 635, the timing circuit outputs a signal containing the time elapsed between the first and second bits and the time elapsed between the second and third bits. The process of sequentially receiving bits and tracking time elapsed between the bits may be repeated many times. As a result, the output signal from the timing circuit may contain a stream of elapsed times between data bits sequentially received into the timing circuit. In a determining operation 640, the output signal from the timing circuit is used to determine a transducer head skew. In an adjustment operation 645, the transducer head is adjusted to reduce or eliminate the transducer head skew based on the result of determining operation 640.

In one implementation, the transducer head skew is adjusted by comparing the time elapsed between the first bit and the second bit with the time elapsed between the second bit and the third bit. The time elapsed between moving from a bit on a first data track (i.e., the first data bit) to a bit on a second data track (i.e., the second data bit) should be equal or nearly equal to the time elapsed between moving from a bit on the second data track (i.e., the second data bit) to a bit on the first data track (i.e., the third data bit), when the transducer head is aligned with the data tracks. The skew error is adjusted until the times elapsed are approximately equal.

In another implementation, experimentation with an aligned transducer head determines a desired time elapsed between bits. Then the skew error may be adjusted until the time elapsed between any two sequential bits equals or approximately equals the desired time. In some implementations, a preamplifier may amplify the read-back signal before it is inputted into the timing circuit and/or amplify the signal output from the timing circuit before it is used to adjust reader head skew.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   outputting a timing signal corresponding to transducer head skew including a first time elapsed between receiving first and second sequential data bits in a read-back signal; and
   adjusting transducer head skew based on comparing the first time elapsed with a target time elapsed corresponding to an aligned reader head.

2. The method of claim 1, wherein the first and second sequential data bits correspond to first and second patterned bits on two separate tracks on a media.

3. The method of claim 2, wherein the media is a bit patterned media disc.

4. The method of claim 1, wherein the timing signal further includes a second time elapsed between receiving the second sequential data bit and a third sequential data bit, wherein the first time elapsed and second time elapsed are different.

5. The method of claim 4, wherein the first time elapsed corresponds to a time between reading a patterned bit on a first data track followed by a patterned bit on a second data track and the second time elapsed corresponds to a time between reading a patterned bit on the second data track followed by a patterned bit on the first data track.

6. The method of claim 4, further comprising:
   adjusting transducer head skew based on comparing the first time elapsed to the second time elapsed.

7. The method of claim 1, wherein one or more additional data bits exist between the first and second sequential data bits.

8. The method of claim 1, further comprising:
   inputting the first data bit into a first stage of a delay chain having a known time delay between each stage of the delay chain; and
   latching the output of the delay chain upon receipt of the second data bit at a data buffer, wherein a number of written data cells in the data buffer is a metric of the first time elapsed.

9. The method of claim 8, wherein each stage of the delay chain corresponds to a time delay between writing two sequential cells of the data buffer.

10. The method of claim 1, further comprising:
    starting a voltage ramp upon receipt of the first data bit; and
    stopping the voltage ramp upon receipt of the second data bit, wherein an output voltage of the voltage ramp is a metric of the first time elapsed.

11. A detector comprising:
    a detector circuit configured to detect first and second sequential data bits in a read-back signal; and
    a timing circuit configured to measure time elapsed between receiving the first and second sequential data bits, wherein the time elapsed corresponds to transducer head skew, wherein the timing circuit includes one or both of a delay chain and a voltage ramp.

12. The detector of claim 11, wherein the first and second sequential data bits correspond to first and second patterned bits on two separate tracks on a media.

13. The detector of claim 11, wherein the detector circuit is further configured to detect a second time elapsed between receiving the second sequential data bit and a third sequential data bit, wherein the first time elapsed and second time elapsed are different.

14. The detector of claim 13, wherein the first time elapsed corresponds to a time between reading a patterned bit on a first data track followed by a patterned bit on a second data track and the second time elapsed corresponds to a time between reading a patterned bit on the second data track followed by a patterned bit on the first data track.

15. One or more non-transitory computer-readable storage media encoding computer-executable instructions for executing on a computer system a computer process, the computer process comprising:
    outputting a timing signal corresponding to transducer head skew including a first time elapsed between receiving first and second sequential data bits in a read-back signal; and
    adjusting transducer head skew based on comparing the first time elapsed with a target time elapsed corresponding to an aligned reader head.

16. The computer-readable storage media of claim 15, wherein the first and second sequential data bits correspond to first and second patterned bits on two separate tracks on a media.

17. The computer-readable storage media of claim 15, wherein the computer process further comprises:
    inputting the first data bit into a first stage of a delay chain having a known time delay between each stage of the delay chain; and
    latching the output of the delay chain upon receipt of the second data bit at a data buffer, wherein a number of written data cells in the data buffer is a metric of the first time elapsed.

18. The computer-readable storage media of claim 15, wherein the computer process further comprises:
    starting a voltage ramp upon receipt of the first data bit; and
    stopping the voltage ramp upon receipt of the second data bit, wherein an output voltage of the voltage ramp is a metric of the first time elapsed.

* * * * *